(12) United States Patent
Tomandl

(10) Patent No.: US 7,841,257 B2
(45) Date of Patent: Nov. 30, 2010

(54) COMPENSATOR FOR CABLES

(75) Inventor: Mark G. Tomandl, Cedar Springs, MI (US)

(73) Assignee: Grand Rapids Controls Company, LLC, Rockford, MI (US)

( * ) Notice: Subject to any disclaimer, the term of this patent is extended or adjusted under 35 U.S.C. 154(b) by 398 days.

(21) Appl. No.: 12/136,925

(22) Filed: Jun. 11, 2008

(65) Prior Publication Data

US 2008/0302201 A1 Dec. 11, 2008

Related U.S. Application Data

(60) Provisional application No. 60/943,176, filed on Jun. 11, 2007.

(51) Int. Cl.
*F16C 1/22* (2006.01)
(52) U.S. Cl. .................................. 74/501.5 R
(58) Field of Classification Search ................ 74/111, 74/500.5, 501.5 R, 502.4, 502.6; 246/152; 267/70, 155, 286
See application file for complete search history.

(56) References Cited

U.S. PATENT DOCUMENTS

| 1,418,828 | A | * | 6/1922 | Ream | 267/286 |
| 1,858,965 | A | * | 5/1932 | Nagamine | 152/184 |
| 3,572,159 | A | * | 3/1971 | Tschanz | 74/502.5 |
| 4,177,691 | A | * | 12/1979 | Fillmore | 74/502.4 |
| 5,301,563 | A | * | 4/1994 | Van Zanten et al. | 74/501.5 R |

\* cited by examiner

*Primary Examiner*—Vicky A Johnson
(74) *Attorney, Agent, or Firm*—Price, Heneveld, Cooper, DeWitt & Litton, LLP

(57) ABSTRACT

A compensator for cables includes a housing and a spring wrapped around inside the housing to form a loop. An inner strand of a Bowden cable or the like extends through the coil spring, and thereby forms a loop. The looped configuration of the coil spring provides a higher effective spring constant, and thereby permits a smaller coil spring to be used. The dimensions of the compensator can also be reduced, thereby reducing the space required for the compensator.

12 Claims, 4 Drawing Sheets

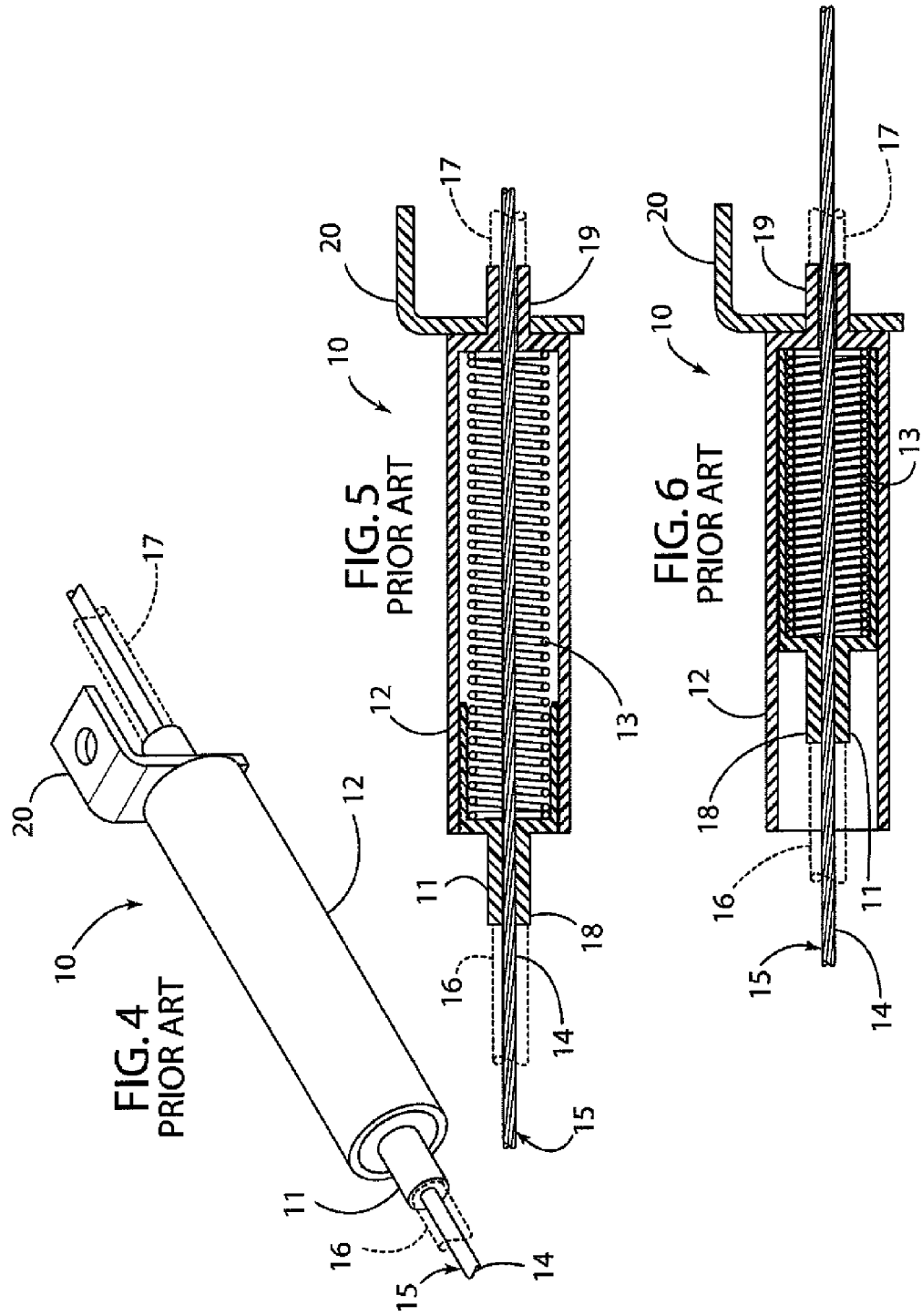

COMPENSATOR FOR CABLES

CROSS REFERENCE TO RELATED APPLICATION

This application claims the benefit of U.S. Provisional Application No. 60/943,176, filed on Jun. 11, 2007, entitled COMPENSATOR FOR CABLES, the entire contents of which are incorporated herein by reference.

BACKGROUND OF THE INVENTION

Various arrangements have been developed to remotely actuate a device via a mechanical link. One known arrangement includes an elongated cable having a flexible inner cable and an outer sheath. Such cables are known as "Bowden cables". Bowden cables have been utilized to actuate seat adjustment mechanisms in chairs and seats for vehicles. Such cables have also been utilized to provide for remote release of, for example, seat components, trunk latches, and other such components.

In general, a user input member or device such as a lever is operably connected to one end of the Bowden cable, and the other end of the cable is mechanically connected to the latch or other device to be actuated. During actuation of the device, the lever or other input member or device is manually moved by the user, thereby generating a tension on the inner cable, and a compressive force on the outer sheath. As the lever is moved, the inner cable shifts, thereby actuating the latch or other mechanism. In use, substantial forces on the components of the cable and other parts of the system may be generated.

Compensator mechanisms have been developed to ensure that the maximum allowable forces for the various components of the system are not exceeded. One known type of prior art compensator 10 is illustrated in FIGS. 4-6. Compensator 10 includes an inner member 11 that is movably disposed within a housing 12. A bracket 20 or the like may be utilized to mount the compensator 10 to a mounting structure of a vehicle, a chair, seat, or other such item. A coil spring 13 is disposed within the housing 12 and biases inner member 11 outwardly to the position illustrated in FIG. 5. It will be understood that a stop (not shown) may be utilized to prevent movement of inner member 11 beyond the position illustrated in FIG. 5, and to provide for preload of coil spring 13. Inner strand 14 of Bowden cable 15 extends through the compensator 10, and shifts longitudinally during use to actuate the adjustment mechanism, latch, or other device to be actuated. Outer sheath sections 16 and 17 of Bowden cable 15 are connected to fitting portions 18 and 19 of inner member 11 and housing 12, respectively. In use, if the maximum allowable force is exceeded, the outer sheath 16 overcomes the preload generated by coil spring 13, and thereby shifts the inner member 11 from the position illustrated in FIG. 5 to the position illustrated in FIG. 6. In this way, the compensator 10 protects against breakage that could otherwise be caused due to generation of excessive forces in the Bowden cable 15 and other system components.

Although known compensators such as the compensator 10 illustrated in FIGS. 4-6 have been somewhat successful, such compensators may be relatively large, thereby causing difficulty in packaging of the compensator and other components. Also, the spring 13 may need to be relatively large in order to generate the desired amount of force. This, in turn, results in a relatively large compensator, and also adds to the cost of the compensator.

Accordingly, a compensator that alleviates the disadvantages of existing compensators would be desirable.

BRIEF DESCRIPTION OF THE DRAWINGS

FIG. 4 is a partially fragmentary isometric view of a prior art compensator;

FIG. 5 is a cross-sectional view of the compensator of FIG. 4 in a non-actuated state;

FIG. 6 is a cross-sectional view of the compensator of FIG. 4 in an actuated state.

DETAILED DESCRIPTION OF PREFERRED EMBODIMENT

Figure 2:
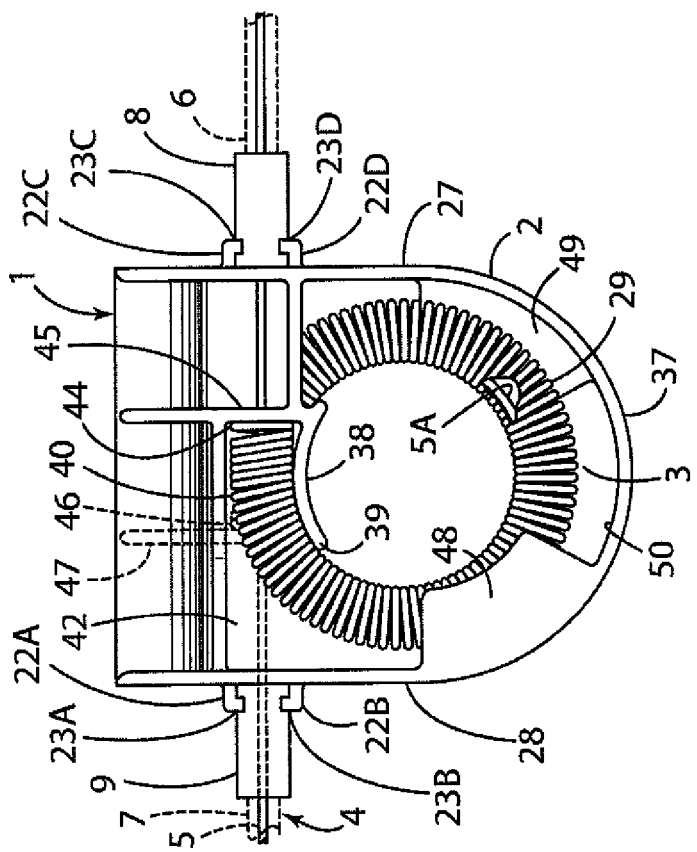
FIG. 2 is a front elevational view of the compensator of FIG. 1 with the coil spring in a preloaded, rest state.
Figure 3:
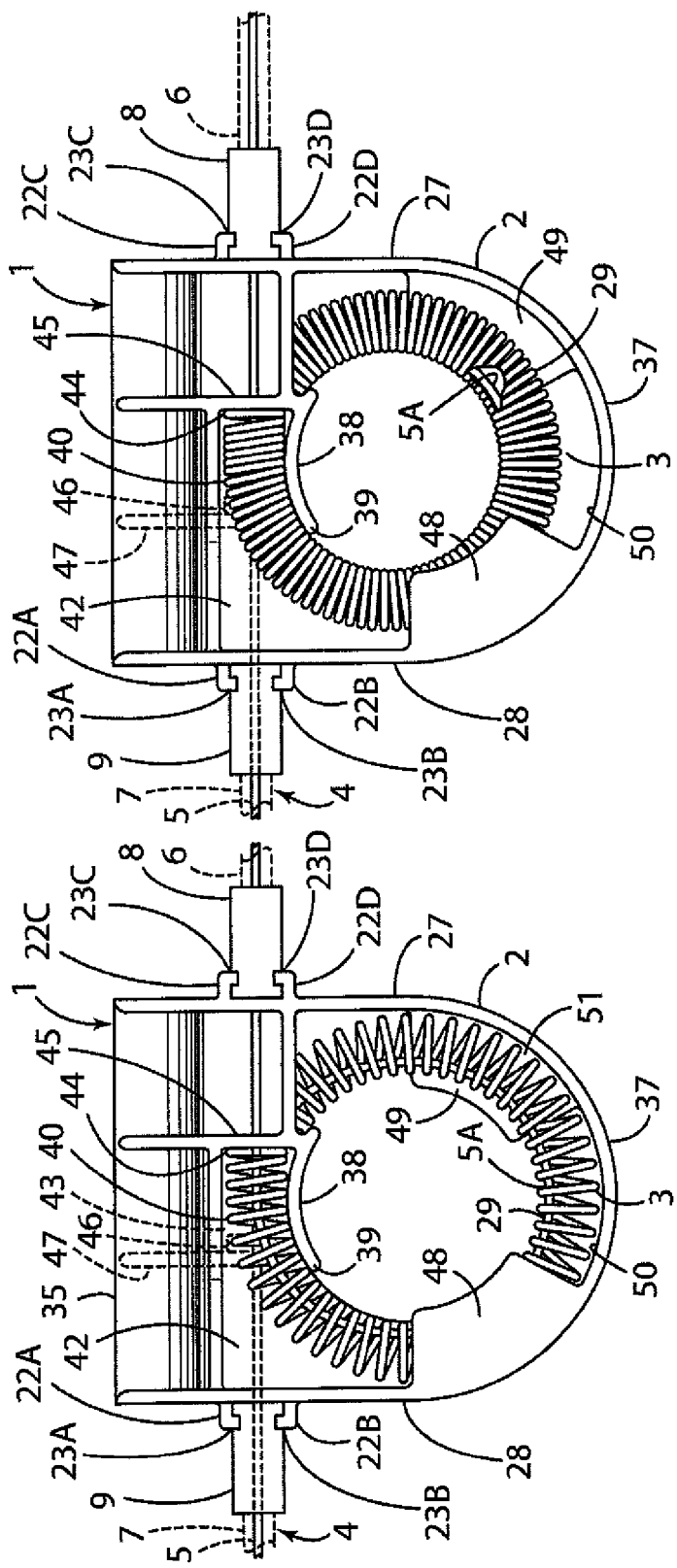
FIG. 3 is a front elevational view of the compensator with the coil spring in a compressed state.

For purposes of description herein, the terms "upper," "lower," "right," "left," "rear," "front," "vertical," "horizontal," and derivatives thereof shall relate to the invention as oriented in FIGS. 2 and 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts. Hence, specific dimensions and other physical characteristics relating to the embodiments disclosed herein are not to be considered as limiting.

Figure 1:
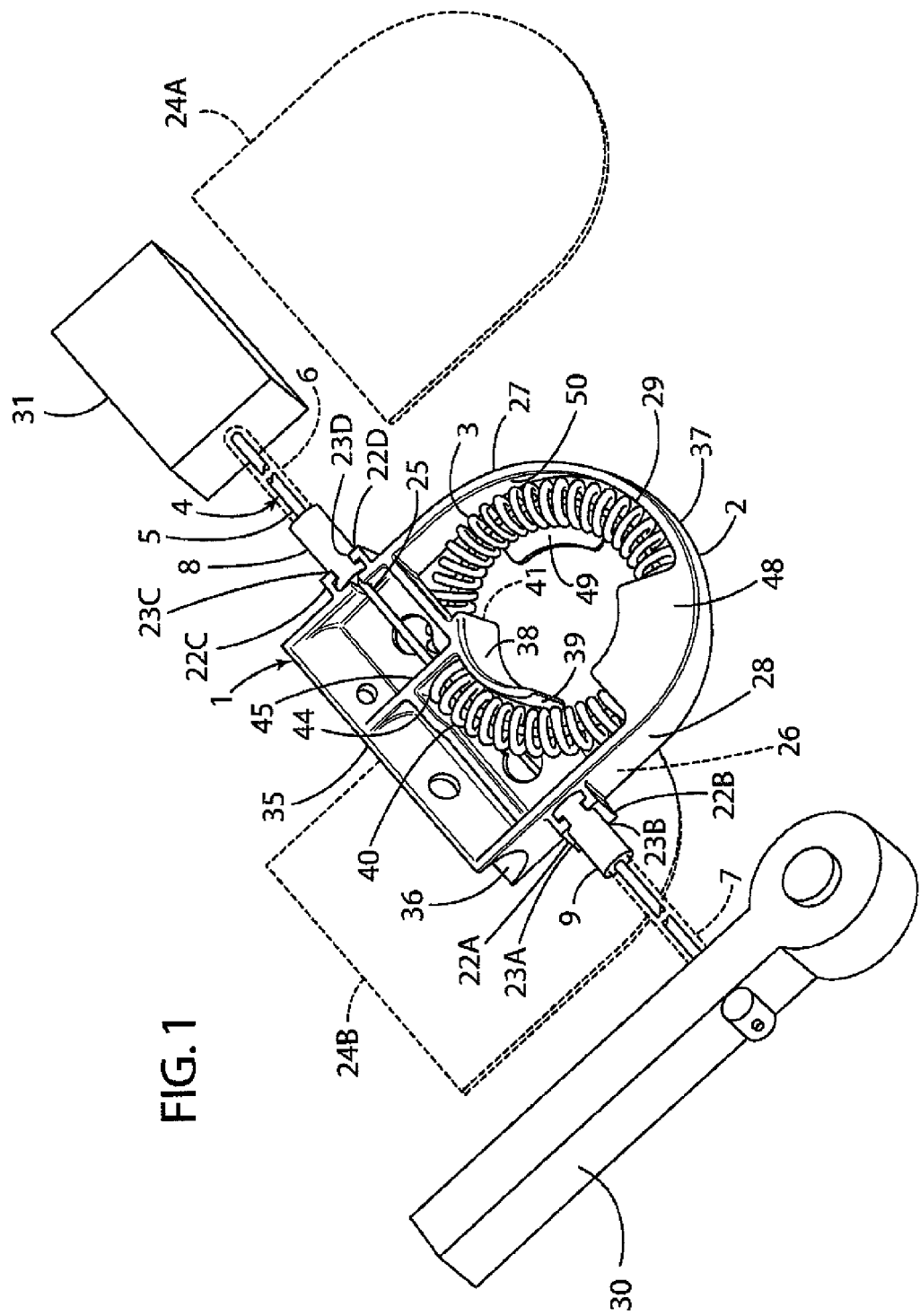
FIG. 1 is a partially schematic, partially fragmentary, isometric view of a compensator for Bowden cables and the like according to one aspect of the present invention.

With reference to FIG. 1, a compensator 1 according to one aspect of the present invention includes a primary structure such as a housing 2, and a coil spring 3 that is supported by the housing 2. A Bowden cable assembly 4 includes a flexible inner cable strand 5, and outer sheath sections 6 and 7 that are connected to fittings 8 and 9, respectively. Compensator 1 may optionally include a pair of covers 24A and 24B that can be connected to the housing 2 to close off the housing 2 and cover the coil spring 3 and other internal components of the compensator 1. Fittings 8 and 9 include opposed slots 23A-23D that receive L-shaped flanges 22A-22D of housing 2 to thereby retain the fittings 8 and 9 to the housing 2 (see also FIGS. 2 and 3). It will be understood that the fittings 8 and 9 may have a variety of configurations, and the flanges 22A-22D and slots 23A-23D are but one example of a suitable arrangement. Inner cable strand 5 extends through slots or openings 25 and 26 through side wall portions 27 and 28, respectively of housing 2, and forms a loop 29 disposed within coil spring 3. The Bowden cable assembly 4 mechanically interconnects a user input device or member such as a lever 30 and a device 31, such that device 31 can be actuated remotely by moving input member 30. It will be understood that the input member 30 may have a variety of configurations, and the device 31 may also have a variety of configurations, depending upon the particular application.

Housing 2 may include a base portion 35 having a cylindrical surface portion 36 for mounting the housing 2 to a cylindrical tube or the like. Housing 2 also includes an outer curved/cylindrical side wall portion 37 that extends between the side wall portions 27 and 28 to support and retain the coil spring 3 in a loop configuration within housing 2. Housing 2 further includes an inner support 38 having a cylindrical surface 39 to support and retain a first end portion 40 of coil spring 3. Another cylindrical surface portion 41 of inner support 38 is positioned on an opposite side of divider wall 42 to support a second end portion 43 of coil spring 3 on an opposite side of divider wall 42 of housing 2. The opposite sides of compensator 1 are mirror images of one another, such that cylindrical surface portion 41 has substantially the same appearance as surface 39 when compensator 1 is viewed from a direction opposite that of FIG. 1. End portions 40 and 43 of coil spring 3 are thereby supported/positioned on opposite sides of divider wall 42 by surfaces 39 and 41. First end 44 of coil spring 3 bears against a stop wall 45 of housing 2, and second end 46 of coil spring 3 bears against a second stop wall 47 positioned on the other side of divider wall 42. Stop wall 47 is disposed on an opposite side of divider wall 42, and has a mirror image of stop wall 45. Housing 2 also includes first and second tabs 48 and 49, respectively, that are mirror images of one another and extend inwardly from the side wall portions 27, 28 and 37 to support and locate the coil spring 3.

With reference to FIG. 2, when the compensator 1 is in a "normal" (non-actuated) configuration, the coil spring 3 is in an expanded state, and bears against inner surface 50 of side wall portion 37. Because the opposite ends 44 and 46 of coil spring 3 are constrained by stop walls 45 and 47, respectively, and the coil spring 3 is also constrained by side walls 27, 28 and 50, the coil spring 3 cannot expand beyond the state shown in FIG. 2. If the inner cable strand 5 is somewhat slack, the portion 5A of inner cable strand 5 positioned within coil spring 3 may be spaced apart somewhat from the individual coils 51 of coil spring 3. A central cable portion 5A slides against coil spring 3. Central cable portion 5A may include a low friction nylon jacket or the like (not shown), or a dry lubricating compound or the like may be applied to the cable strand portion 5A and/or coil spring 3 to reduce friction and wear of the cable strand 5A and/or coil spring 3. The coil spring 3 is compressed somewhat when in the configuration illustrated in FIG. 2 to thereby preload the spring. As a user moves the input device/lever 30 (FIG. 1), tension on inner cable strand 5 is generated, and the central portion 5A of inner cable strand 5 will bear against the coils 51 of coil spring 3. Because the coil spring 3 is preloaded, force generated by inner cable strand 5 will not compress coil spring 3 unless the tension in cable strand 5 exceeds a predetermined level.

With further reference to FIG. 3, if the tension on inner cable strand 5 exceeds the predetermined preload level, the cable strand 5 will cause the coil spring 3 to compress to the configuration illustrated in FIG. 3. As the coil spring 3 is compressed, the effective length of inner cable strand 5 is increased, such that movement of input device 30 by a user does not cause a corresponding movement of cable strand 5 at device 31. In this way, the compensator 1 limits the amount of force in inner cable strand 5 and the other components of the system to prevent damage that could otherwise occur if the maximum allowable force levels for the system were to be exceeded.

The configuration of the coil spring 3 of compensator 1 generates a higher force as a function of displacement/movement of the Bowden cables compared to a conventional in-line spring arrangement found in the prior art compensator 10 of FIGS. 4-6 for a given size spring. In general, the force generated by a spring as a function of the displacement of the spring can be described as a linear function of the displacement:

$$F = kx \quad [1.0]$$

where:
F=force
k=spring constant
x=displacement

However, because coil spring 3 of compensator 1 is looped, the effective spring constant, k, of coil spring 3 is substantially higher than when coil spring 3 is in a linear configuration. Thus, a smaller coil spring 3 can be utilized in compensator 1 to generate the desired level of force at a given displacement compared to a conventional in-line coil spring arrangement as illustrated in FIGS. 4-6. In this way, the cost associated with producing compensator 1 are reduced relative to conventional in-line arrangements. Also, because the coil spring 3 may have a relatively small size, compensator 1 can be configured to have a small overall size, thereby alleviating the problems associated with positioning a conventional compensator in a seat, chair, vehicle, or the like.

Figure 7:
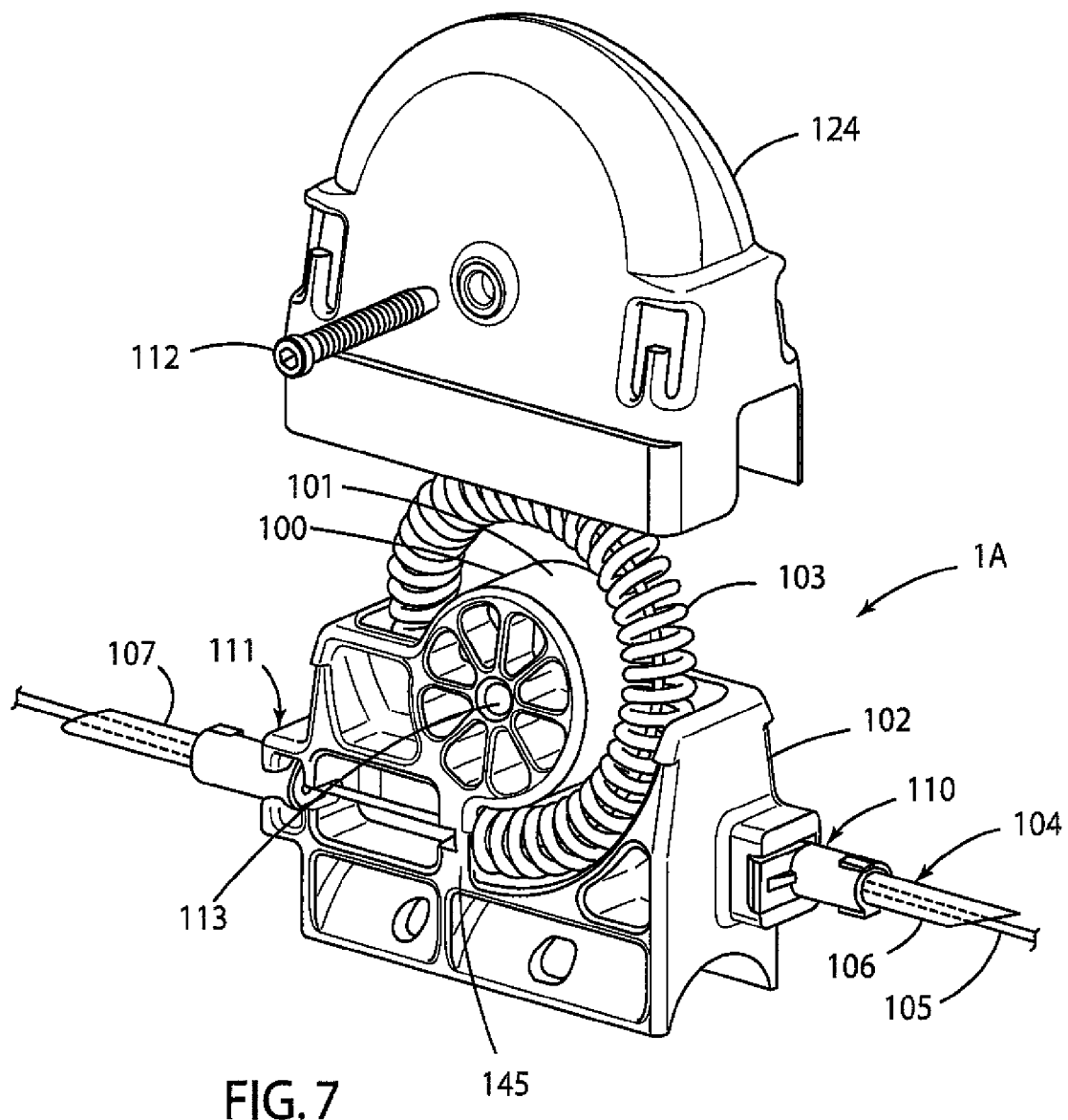
FIG. 7 is an exploded, partially fragmentary, isometric view of a compensator according to another aspect of the present invention.

With reference to FIG. 7, a compensator 1A according to another aspect of the present invention functions in substantially the same manner as the compensator 1 described in more detail above. The compensator 1A, however, includes a one-piece cover 124 that is secured to housing 102 by a threaded fastener 112 that is received in an opening 113 through a cylindrical center portion 100 of housing structure 102. The cylindrical center portion 100 of housing structure 102 includes a cylindrical outer surface 101 that provides a guide or stabilizing surface to ensure that coil spring 103 is properly positioned. The ends of the coil spring 103 abut a stop wall 145 that functions in substantially the same manner as stop wall 45 described in more detail above. Housing structure 102 includes fitting portion 110 and 111 that connect to the outer sheath portions 106 and 107 of a Bowden cable assembly 104.

In the foregoing description, it will be readily appreciated by those skilled in the art that modifications may be made to the invention without departing from the concepts disclosed herein.

The invention claimed is:

1. A compensator for cables, comprising:
    a housing structure having first and second cable connection portions;
    a cable assembly including a first outer sheath section connected to the first cable connection portion of the housing structure, a second outer sheath section connected to the second cable connection portion, and an elongated flexible inner strand disposed within the first and second outer sheath sections;
    a coil spring connected to the housing structure, the coil spring defining an inside and comprising a series of first loops that in turn form an enlarged loop, and wherein:
    a portion of the flexible inner strand is disposed within the first loops of the coil spring and extends around inside the coil spring to form a loop, whereby the flexible inner strand contacts the inside of the coil spring and compresses the coil spring when the flexible inner strand is tensed.

2. The compensator for cables of claim 1, wherein:
    the enlarged loop formed by the coil spring is generally circular.

3. The compensator for cables of claim 2, wherein:
    the coil spring defines first and second opposite end portions that overlap one another.

4. The compensator for cables of claim 1, wherein:
the housing structure defines an inwardly-facing cylindrical surface extending about the enlarged loop of the coil spring.

5. The compensator for cables of claim 1, wherein:
the coil spring defines opposite ends;
the housing structure includes oppositely facing spring stop surfaces; and wherein:
the opposite ends of the coil spring engage the spring stop surfaces.

6. The compensator for cables of claim 1, wherein:
the first and second cable connection portions comprise fittings connected to the first and second outer sheath portions of the cable assembly.

7. The compensator for cables of claim 1, wherein:
the housing structure defines a cavity, and the coil spring is disposed in the cavity.

8. The compensator for cables of claim 1, wherein:
the flexible inner strand defines first and second opposite ends; and
an input device operably connected to the first opposite end of the flexible inner strand,
and output device operably connected to the second opposite end of the flexible inner strand; and wherein:
the input device selectively moves the first opposite end of the flexible inner strand relative to the first outer sheath section.

9. The compensator for cables of claim 8, wherein:
the input device defines an actuated state and a non-actuated state, and wherein the input device and the output device together provide a preload tension on the flexible inner strand that compresses the coil spring a first amount when the input device is in the non-actuated state, and wherein the input device causes the flexible inner strand to be tensioned a second amount that is greater than the preload tension and compresses the coil spring a second amount that is greater than the first amount.

10. The compensator for cables of claim 9, wherein:
the enlarged loop defines a size, and wherein the size of the enlarged loop is decreased when the coil spring is compressed the second amount relative to the size of the enlarged loop when the coil spring is compressed the first amount.

11. The compensator for cables of claim 1, wherein:
the housing structure defines an outwardly-facing cylindrical surface, and the coil spring extends around the cylindrical surface.

12. The compensator for cables of claim 11, including:
a cover member secured to the housing structure and substantially covering the coil spring.

* * * * *